United States Patent
Baseri et al.

(10) Patent No.: US 11,876,200 B2
(45) Date of Patent: Jan. 16, 2024

(54) THERMAL SHIELD FOR PROTECTION OF ELECTRICAL COMPONENTS IN ELECTRIC VEHICLE BATTERY PACK

(71) Applicant: Rivian IP Holdings, LLC, Plymouth, MI (US)

(72) Inventors: Ehsan Baseri, Irvine, CA (US); Kyle Butterfield, Rancho Santa Margarita, CA (US); Vignesh Sekar, Canton, MI (US)

(73) Assignee: Rivian IP Holdings, LLC, Plymouth, MI (US)

( * ) Notice: Subject to any disclaimer, the term of this patent is extended or adjusted under 35 U.S.C. 154(b) by 9 days.

(21) Appl. No.: 17/373,982

(22) Filed: Jul. 13, 2021

(65) Prior Publication Data

US 2023/0016266 A1    Jan. 19, 2023

(51) Int. Cl.
*H01M 10/6554* (2014.01)
*H01M 10/625* (2014.01)
*H01M 10/658* (2014.01)

(52) U.S. Cl.
CPC ..... *H01M 10/6554* (2015.04); *H01M 10/625* (2015.04); *H01M 10/658* (2015.04); *H01M 2220/20* (2013.01)

(58) Field of Classification Search
CPC ........... H01M 10/6554; H01M 10/625; H01M 10/658; H01M 2220/20
See application file for complete search history.

(56) References Cited

U.S. PATENT DOCUMENTS

| | | | |
|---|---|---|---|
| 11,600,979 B2 | 3/2023 | Baseri et al. | |
| 2013/0122339 A1* | 5/2013 | Chae | H01M 10/6556 429/99 |
| 2014/0322581 A1* | 10/2014 | Ruter | H01M 50/503 429/186 |
| 2016/0226041 A1* | 8/2016 | Jackson | H01M 10/625 |
| 2016/0322624 A1* | 11/2016 | Ichikawa | H01M 50/519 |
| 2017/0373287 A1* | 12/2017 | Yamashita | H01M 50/367 |
| 2021/0013460 A1* | 1/2021 | Ootsuki | C08K 3/30 |

* cited by examiner

*Primary Examiner* — Lisa S Park
(74) *Attorney, Agent, or Firm* — Haley Guiliano LLP (57) ABSTRACT

An electric vehicle battery pack with a thermal shield that protects internal components from, for example, battery ventilation, and in particular allows battery pack electrical components to be placed above venting ends of batteries. The thermal shield is positioned above the venting ends of one or more batteries, and various battery pack electrical components may be placed above the thermal shield. Gases and particulate matter from battery venting are thus intercepted and deflected by the thermal shield, instead of damaging battery pack electrical components. In this manner, various battery pack electrical components may be placed above battery venting ends without risk of damage. This allows for a more compact and versatile arrangement of battery pack components.

20 Claims, 6 Drawing Sheets

THERMAL SHIELD FOR PROTECTION OF ELECTRICAL COMPONENTS IN ELECTRIC VEHICLE BATTERY PACK

INTRODUCTION

The present disclosure is directed generally to electric vehicles. More specifically, the present disclosure is directed to thermal shields for protection of electrical components in electric vehicle battery packs.

SUMMARY

A vital component of contemporary electric vehicles is the battery pack. Conventional battery packs may have a frame that provides the structural rigidity and strength to withstand impact, a bottom layer, and a top layer or lid. Within this structure, battery packs provide space for securely containing a number of batteries that provide electrical power for propulsion and for running the various systems of the electric vehicle.

These battery packs present certain risks and limitations, however. In particular, batteries may in certain circumstances encounter high thermal temperatures and, in extreme circumstances, encounter thermal events such as the venting release of flammable gases or exothermic reactions leading to thermal runaway, thereby potentially damaging the other nearby components of the battery pack. Accordingly, some battery pack designs may be limited in their ability to house electrical components or other parts which may be susceptible to thermal damage. Such components may be located away from batteries or their venting ends to avoid risk of thermal damage, which presents a significant design constraint within the typically tight confines of a battery pack.

Accordingly, systems and methods are disclosed herein that provide thermal shielding to protect electrical and other components within a battery pack, thus allowing components to be placed closer to batteries, and in particular to be placed directly over the venting portions of batteries, such as the venting ends of batteries. This in turn allows for more compact placement of battery pack components, and thus for smaller battery packs and/or battery packs that can contain greater numbers of components.

In some embodiments of the disclosure, a thermal shield may be placed over the venting ends of one or more batteries, and a number of electrical or other components may be placed over or above this thermal shield. That is, battery pack components may be located over the venting ends of battery pack batteries or battery modules, with a thermal shield placed between the components and the batteries to protect the components. The thermal shield may be constructed of a metallic substrate such as a steel substrate structure, and shaped to support or couple to any number of battery pack components. This metallic shield acts as a physical barrier isolating and preventing gases and particulate matter expelled from the battery when undergoing a thermal event from damaging the components thereon. In particular, the metallic shield deflects gases and other materials away from the components, and serves as a barrier preventing damage due to heat from a battery thermal event.

The substrate may optionally have a thermal-resistant coating, such as flame-resistant coatings, formed on the side facing the batteries. This coating may be of any material that increases the thermal resistance of the thermal shield. Examples of such coatings include polymer resin coatings such as epoxy layers. Coatings may also be powder or mineral coatings that provide added resistance to heat. Any combination of any such materials may also be employed. For example, coatings may be polymer resin coatings with thermal resistant particulate matter contained therein. Exemplary such coatings may thus have greater surface roughness that allows them to better resist or deflect grit and other particulate matter contained in battery venting emissions.

Thermal shields of embodiments of the disclosure may support or be coupled to any battery pack components, electrical or otherwise. That is, thermal shields of embodiments of the disclosure may be employed to protect any battery pack components. As examples, such thermal shields may be coupled to, or support, various electrical components such as busbars, connectors, wires, or other electrical conduits, as well as batteries, electronics, sensors, or the like.

The thermal shield may also be of any size and shape suitable for coupling to and protecting any component in any location within the battery pack. As an example, thermal shields may be constructed with a track or extension that extends along the pathway of cables or other connectors, to protect the entire length of such cables or connectors, or any portion thereof, from thermal damage. Thus, for instance, the thermal shield may be shaped to cover a busbar, and may also have an extension running under the length of any busbar connector that connects the busbar to other vehicle components external to the battery pack.

It is also noted that the thermal shield may be placed at any height or distance above any batteries. For example, thermal shields may be placed at least 5 mm above any batteries or battery modules. Any distance sufficient for thermal protection of battery pack components is contemplated.

Embodiments of the disclosure thus provide a thermal shield for use within electric vehicle battery packs, placed between venting ends of batteries and any battery pack components. Thermal shields may be placed so that one side faces the venting ends of batteries, and their opposing side supports various battery pack components. In this manner, thermal shields intercept and deflect heat emitted from the venting ends of batteries or battery modules, preventing such venting emissions from damaging the battery pack components.

BRIEF DESCRIPTION OF THE FIGURES

The above and other objects and advantages of the disclosure will be apparent upon consideration of the following detailed description, taken in conjunction with the accompanying drawings, in which like reference characters refer to like parts throughout, and in which.

DETAILED DESCRIPTION

In one embodiment, the disclosure relates to an electric vehicle battery pack with a thermal shield that protects internal components from battery heat and thermal events, and in particular allows battery pack components to be placed above venting ends of batteries. The thermal shield is positioned above the venting ends of one or more batteries, and various battery pack components may be placed above the thermal shield. Gases and particulate matter from any battery venting emission are thus intercepted and deflected by the thermal shield, instead of damaging battery pack components. In this manner, various battery pack components may be placed above battery venting ends without risk of damage. This allows for a more compact and versatile arrangement of battery pack components.

Figure 1:
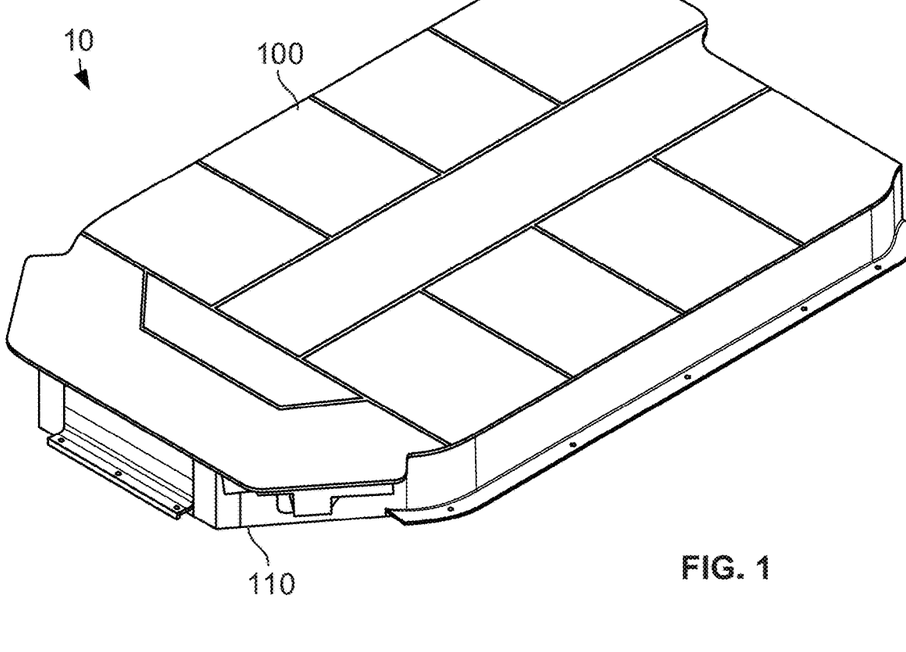
FIG. 1 is an isometric view of an electric vehicle battery pack assembly constructed in accordance with embodiments of the disclosure.

FIG. 1 is an isometric view of an electric vehicle battery pack assembly 10 constructed in accordance with embodiments of the disclosure. Here, the battery pack assembly 10 includes a cover 100 and frame 110 to which it is affixed, such as by screws, bolts, or the like. A number of batteries are positioned and secured within the frame 110, and the frame 110 is affixed to an electric vehicle, where it provides electrical power to operate the vehicle. In some embodiments, the batteries are arranged into separate battery modules and the battery modules are individually positioned and secured to the frame 110. In one example, eight rectangular battery modules are included in the battery pack assembly, although any number and arrangement of battery modules is contemplated.

Figure 2:
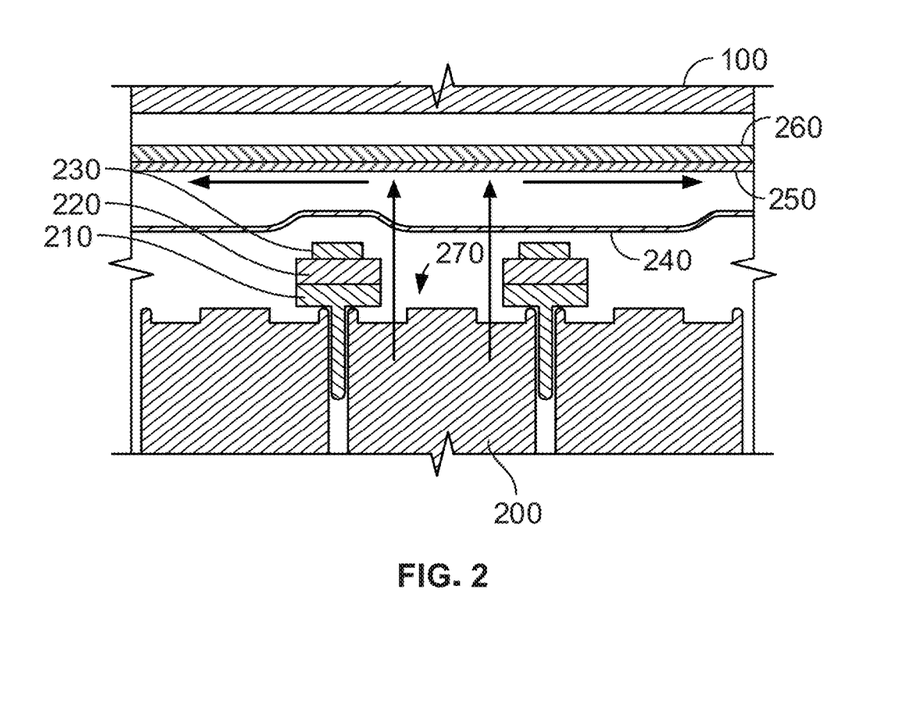
FIG. 2 is a cross-sectional view of the battery pack assembly of FIG. 1, illustrating a thermal shield constructed in accordance with embodiments of the disclosure.

FIG. 2 is a partial cross-sectional view of the battery pack assembly of FIG. 1, illustrating a thermal shield constructed in accordance with embodiments of the disclosure. A number of batteries 200 are secured within and to the frame 110, with each having a corresponding spacer 210, busbar 220 portion for electrically connecting to the batteries 200, and nonconductive structural layer 230. The spacer 210 maintains spacing between adjacent batteries 200. The batteries 200 and corresponding structure are positioned within battery module housing 240.

When a battery increases in temperature to reach a thermal event (e.g., due to a thermal runaway event), it typically emits a jet of grit-infused flame. The flame typically emanates from a venting end of the battery that contains a safety valve or cap of a battery cell, which is usually located at the top of a cylindrical battery cell. The vertical arrows of FIG. 2 show the general direction of the grit-infused flame emitted from the venting ends 270 of battery cells 200 when they undergo an undesired thermal event. The heat and abrasive grit can quickly wear a hole in battery module housing 240 and conventional covers, allowing flames to escape therethrough and potentially other components of the battery pack. It can be observed that any components susceptible to damage from the higher temperatures of the thermal event typically cannot be placed over the venting ends 270 of batteries 200, due to the risk of damage. However, a thermal- and abrasion-resistant thermal shield 250 may be placed over the venting ends 270, e.g., any battery cell 200 surface from which thermal event gases or particulate matter may escape, of battery cells 200 in accordance with embodiments of the disclosure, to resist the heat and grit of battery heat, directing the flames laterally away (in the direction of the horizontal arrows of FIG. 2) and preventing burn-through. This prevents battery heat and/or flammable venting emissions from directly reaching the outside housing (e.g., cover 100) of the battery pack. As battery heat is blocked by the thermal shield 250, a number of components 260, such as electrical components or the like, can be positioned on the opposite side of thermal shield 250. Thermal shields 250 of embodiments of the disclosure thus allow components 260 to be placed directly over battery 200 venting ends 270 by minimizing and/or eliminating their potential risk of damage from battery 200 undergoing a venting event, thus increasing the space available for components 260 within the battery pack 10 and allowing for more efficient use of space therein.

Figure 3:
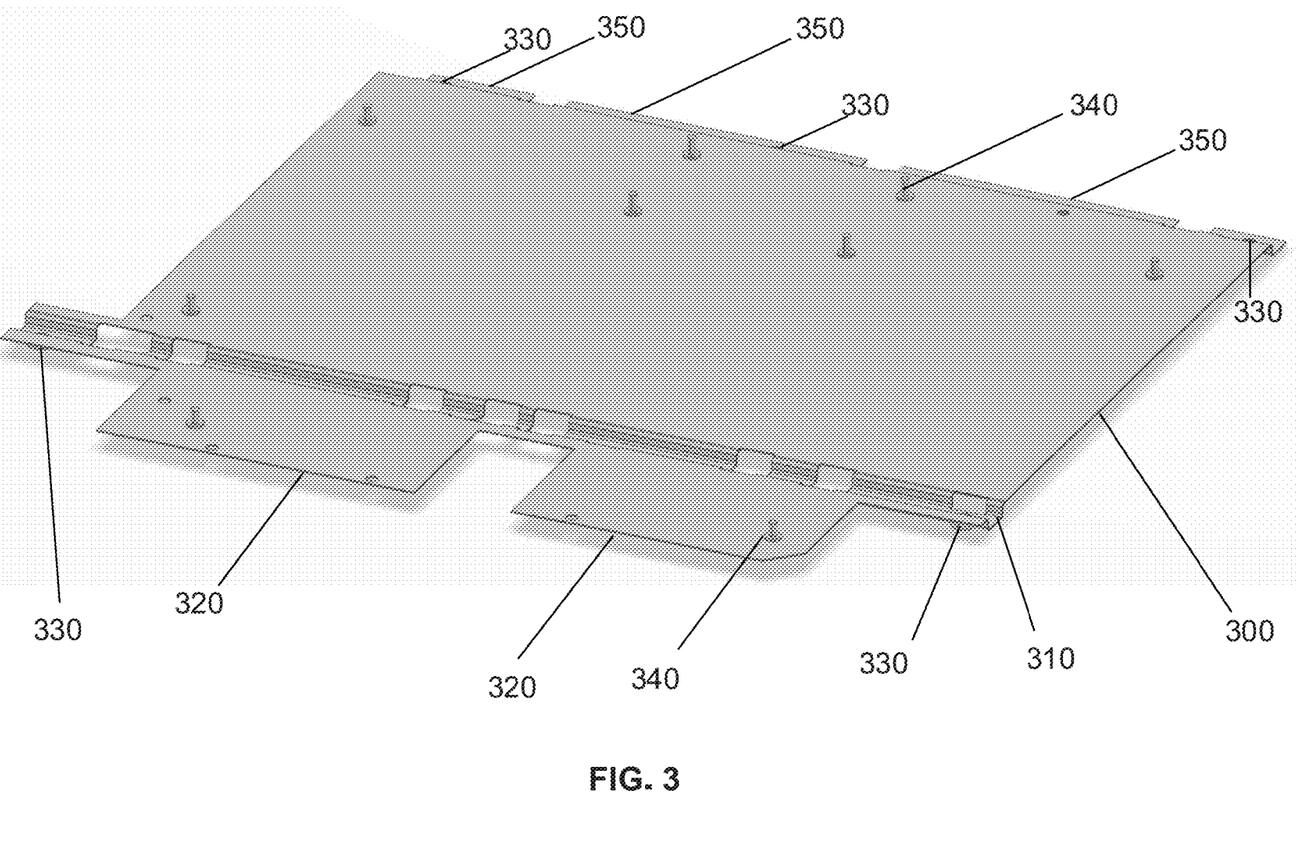
FIG. 3 is an isometric view of a thermal shield constructed in accordance with embodiments of the disclosure.

FIG. 3 is an isometric view of a thermal shield constructed in accordance with embodiments of the disclosure. Here, a thermal shield 300 may correspond to thermal shield 250 of FIG. 2, and may be a metallic or other heat-resistant structure constructed to support a number of electrical or other components thereon. Thermal shield 300 may be any thermal-resistant structure capable of supporting any one or more battery pack components thereon. In some embodiments of the disclosure, thermal shield 300 is a platelike structure having a channel 310 formed for connection to cross members or other structural portions of assembly 10 such as various portions of frame 110. The channel 310 may have a number of connection bodies 330 which may be holes for receiving connectors such as screws or bolts, and may include washers, spacers, or other connecting elements. Such connecting elements may be stamped, or otherwise affixed to the channel 310 by, e.g., welding, adhesives, or the like. Channel 310 may provide an elevation from the lower surface of connection body 330, raising the thermal shield 300 to a desired elevation above underlying batteries 200. Similarly, flanges 350 may be formed to extend from the opposing side of thermal shield 300 as channel 310, for connection to cross members or other structural portions of battery pack 10 such as various portions of frame 110. Similar to channel 310, flanges 350 may have a number of connection bodies 330 formed therein or thereon, for connection of thermal shield 300 to frame 110 or another structure of battery pack 10.

Thermal shield 300 also has a number of extensions 320 for supporting any desired components of battery pack assembly 10. Extensions 320 as well as the remainder of thermal shield 300 may have any shape or shapes suitable for supporting any one or more components of assembly 10. Thermal shield 300 may be formed as a single unitary structure, or may be multiple separate structures that may be connected to each other or otherwise coupled so as to provide thermal shielding for overlying components.

Thermal shield 300 includes a number of posts 340 placed at positions along thermal shield 300 to act as locating and/or attachment features for battery pack assembly 10 components. Embodiments of the disclosure contemplate any number, location, and configuration of posts 340 suitable for use in securing components of battery pack assembly 10 thereon. In some embodiments of the disclosure, posts 340 may be pins or other features press-fit into thermal shield 300, and may be configured to allow various components to be snap-fit onto or otherwise coupled to thermal shield 300. In some embodiments, busbar interconnections may be positioned above thermal shield 300.

Thermal shield 300 may be any thermal-resistant structure. As one example, thermal shield 300 may be a stamped metallic plate such as a steel plate or the like. As further examples, thermal shield 300 may be made of a composite, a ceramic, or any one or more materials suitable for formation of a thermal-resistant structure. Thermal shield 300 may, for example, be constructed of any material capable of resisting higher temperatures of at least 300-400° C. without melting or significantly deforming. In some embodiments of the disclosure, thermal shield 300 may be coated with a thermal-resistant coating for further protection of its overlying components. Any suitable coating is contemplated. As one example, at least the side of thermal shield 300 that faces batteries 200 may be coated with a high temperature powder coating. Such powder coatings produce a rough surface which has been found to better absorb and/or deflect the particulate matter often found in battery 200 jets. Any powder coating may be employed. For instance, an epoxy based powder coating such as an Interpon® 100 coating from Akzo Nobel N.V., or a similar coating, may be used. While an epoxy coating is offered here as a specific example, embodiments of the disclosure are not limited to epoxies, and also contemplate use of any polymer resin. Embodiments of the disclosure also contemplate application of any thermal-resistant coating to any surface of any other components of battery pack assembly 10, for purposes of prevention of damage from any thermal events. As one example, any thermal-resistant coatings of embodiments of the disclosure may be applied to insulate or encapsulate any one or more surfaces of batteries 200, to retard thermal events initiated therefrom, or prevent damage from thermal events of neighboring components.

Figure 4A:
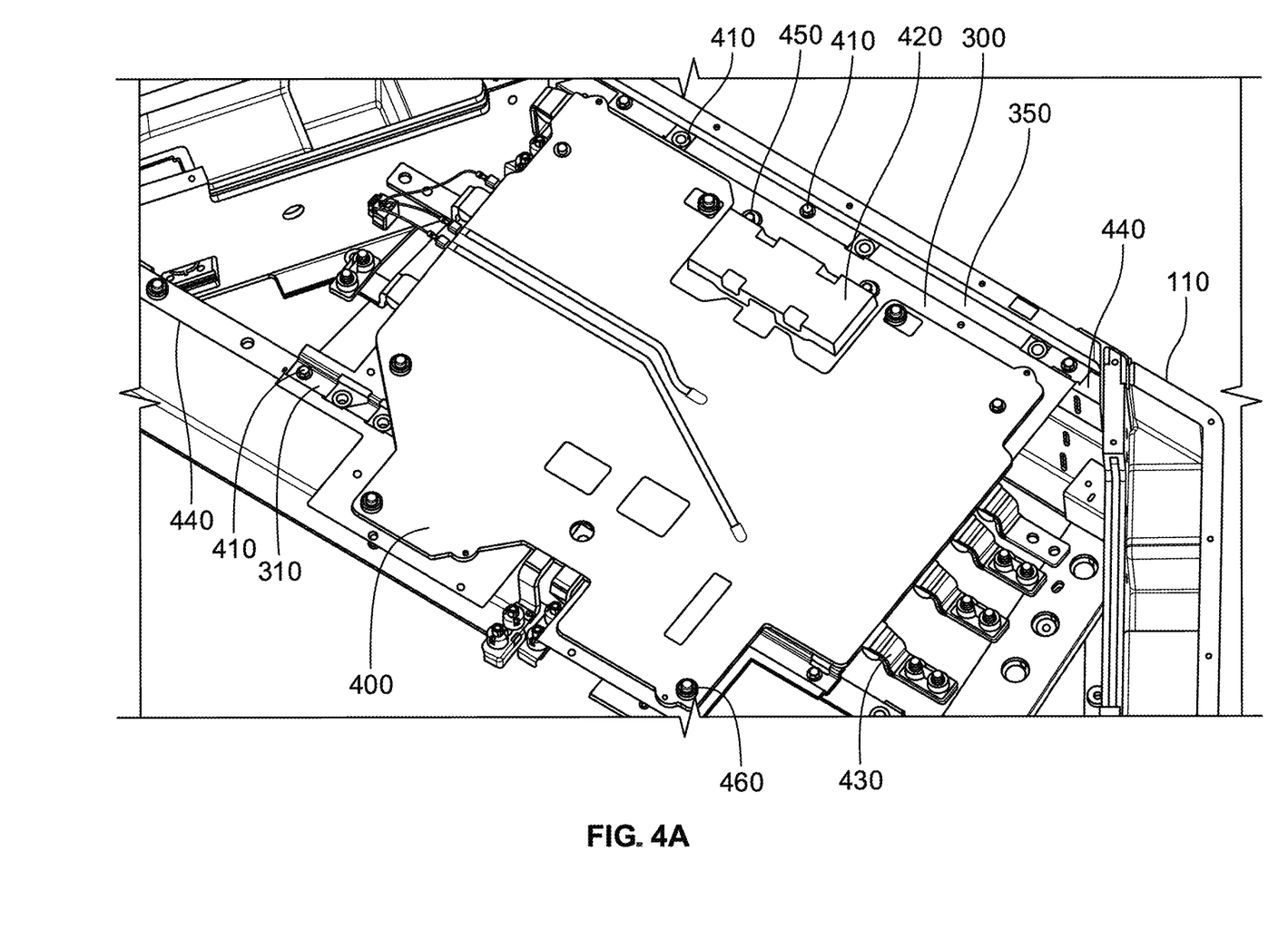
FIGS. 4A and 4B are isometric assembly views of a thermal shield placed within a battery pack, in accordance with embodiments of the disclosure.
Figure 4B:
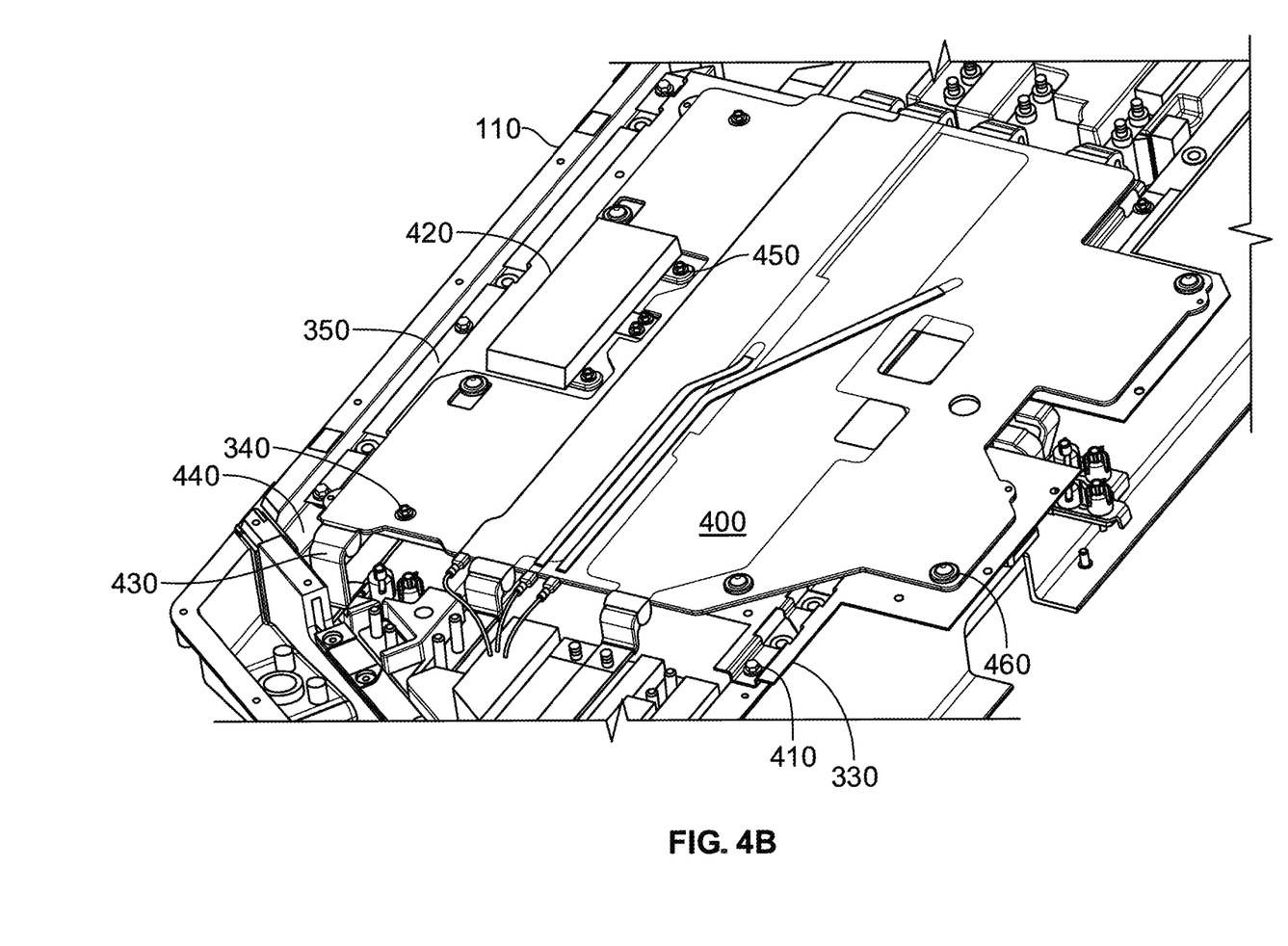

FIGS. 4A and 4B are isometric assembly views of a thermal shield placed within a battery pack, in accordance with embodiments of the disclosure. Here, thermal shield 300 is shown as connected to frame 110 via a number of connectors 410 such as screws or bolts. The thermal shield 300 may be connected to any portion of battery pack assembly 10, such as any one or more cross members 440 of frame 110. As shown in FIGS. 4A and 4B, thermal shield 300 is connected to cross members 440 via a number of screws 410, although as above any connection mechanism may be used, such as bolts, other fasteners, adhesives, or the like. As shown in FIG. 2, a number of battery modules (e.g., one) containing batteries 200 are connected to frame 110 underneath thermal shield 300, and are thus not shown in FIGS. 4A-4B (as they are covered by thermal shield 300) but are positioned with at least some battery venting ends facing the lower surface of thermal shield 300.

Any battery pack 10 components, such as a busbar 400 (e.g., a busbar carrying the full voltage of the battery pack) and one or more electronic components 420, are positioned on thermal shield 300 using posts 340 as locating features. These components 400, 420 may be affixed to thermal shield 300 in any manner, such as by one or more fasteners 450, 460. Fasteners 450, 460 may be any fastening elements such as screws, bolts, adhesive connections, or the like. One or more connectors 430 may extend from components such as busbar 400 to other elements of battery pack 10, to place components such as busbar 400 in electrical or other communication with these other elements as desired. The connectors 430, which may be electrical connectors, may extend along outer edges of thermal shield 300, to connect to any other desired components of battery pack 10.

Thermal shield 300 may be affixed to frame 110 such that it is any desired elevation above its underlying batteries 200. In particular, thermal shield 300 may be placed as far from the venting ends of underlying batteries 200 as possible or as desired within the space constraints of the battery pack 10, e.g., without contacting the cover 100 of battery pack 10. As one example, thermal shield 300 may be placed at least 5 mm from any underlying battery 200. In some embodiments, battery pack 10 is manufactured by first installing the underlying battery module, then thermal shield 300, and then the overlying components (e.g., busbar 400 and electronic component 420).

The thermal shield 300 thus supports a number of battery pack 10 components thereon and above venting ends of batteries 200. That is, thermal shield 300 is positioned above batteries 200, between the venting ends of batteries 200 and one or more other components (e.g., electrical components) of battery pack 10. In this manner, thermal shield 300 deflects gases and particulate matter from battery 200 flame jets, preventing them from contacting or otherwise overheating the components (e.g., components 400, 420) positioned above the upper surface of shield 300. Components of battery pack 10 may thus be located over venting ends of batteries 200 without risk of damage, allowing various components to be positioned at locations that otherwise would not have been possible without thermal shield 300.

Figure 5:
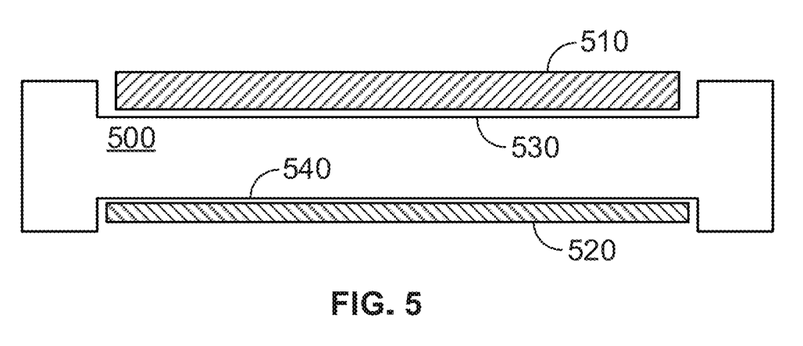
FIG. 5 is a cross-sectional view of a carrier having a thermal shield coupled thereto in accordance with embodiments of the disclosure.

FIG. 5 is a cross-sectional view of a carrier having a thermal shield coupled thereto in accordance with embodiments of the disclosure. In some embodiments of the disclosure, it may be desirable to protect connectors 430 or other components of the battery pack 10 that extend beyond the boundaries of the thermal shield 300 shown in FIG. 3. Accordingly, some embodiments of the disclosure include an extension of thermal shield 300 to protect such connectors 430 or other components from thermal damage. As one example, connectors 430 or other electrical conduits may extend from busbar 400 to edges of frame 110, to provide electrical connection between busbar 400 and various electrical systems of the vehicle. Embodiments of the disclosure contemplate corresponding extensions of thermal shield 300 to protect these electrical conduits. In particular, a supporting member 500 or carrier may be configured to extend along substantially the entire length of an electrical conduit (e.g., the length overlying venting ends of batteries 200), supporting both the conduit and an extension of thermal shield 300 to protect the electrical conduit from thermal damage in the same manner as described above.

Supporting member 500 may be constructed as a track extending along a path from an edge of thermal shield 300 (or any other starting location) to any other portion of the battery pack 10, such as an edge thereof. In some embodiments, supporting member 500 has recesses in its upper and lower surfaces as shown, with the upper recess 530 being a first surface shaped to support a connector 510 of a component such as busbar 400 therein, and the lower recess 540 being a second surface that is shaped to support a thermal shield 520 therein. Supporting member 500 may be constructed of any suitable material, such as a plastic or other electrically insulative material, a metal such as an aluminum or steel, or the like. Further, supporting member 500 may extend over any batteries 200, along any desired path within battery pack 10. In some embodiments of the disclosure, supporting member 500 may extend generally along structural members of the battery pack 10, to be coupled thereto for adequate support. More specifically, supporting member 500 may extend along one or more side members or cross members 440 of frame 110, and may be coupled thereto in any suitable manner, such as by brackets or other attachment mechanisms or features formed in or affixed to supporting member 500. For example, supporting member 500 may be affixed to portions of frame 110 by screws, bolts, adhesive connections, ties, or the like.

The connector 510 may be any extension of any one or more components supported by thermal shield 300, or any connection between any component supported by thermal shield 300 and another component of the battery pack 10 or its vehicle. In some embodiments of the disclosure, the connector 510 is an electrical connector that extends to an interface at an outer surface of the battery pack 10 to place the busbar 400 in electrical communication with one or more systems of its electric vehicle (e.g., to provide power to a rear vehicle drive unit). This electrical connector may be any electrical conduit, such as a flexible circuit, a wire or wire bundle, or the like. Connector 510 may for example include any electrical or electronic component such as wires or circuitry. Connector 510 is affixed within the upper recess 530 of supporting member 500 in any suitable manner, such as an adhesive, connectors such as screws or bolts, clamps, brackets, ties, or the like.

Thermal shield 520 may be an extension of thermal shield 300, or may be a separate body that is not a continuous extension of thermal shield 300. In either case, the thermal shield may be considered as having a first portion which may be, for example, thermal shield 300 shown in FIGS. 3 and 4A, and a second portion which may be, for example, thermal shield 520 which extends from thermal shield 300 and is coupled to supporting member 500. The thermal shield 520 may be made of the same material or materials as thermal shield 300, and may have the same construction, although embodiments of the disclosure are not limited in this manner.

The thermal shield 520 may be any thermal shield, having any construction and materials suitable for preventing battery thermal damage to overlying components such as connector 510. Thermal shield 520 is affixed to the lower recess 540 of supporting member 500 in any secure manner, such as by adhesives, connectors such as screws, brackets, ties, or the like. Accordingly, supporting member 500 may be placed over venting ends of batteries 200, with thermal shield 520 facing these venting ends. The thermal shield 520 may thus deflect battery flame jets, preventing damage to overlying connectors 510 or other components. In this manner, components may be routed anywhere within battery pack 10, including over battery 200 venting ends, with thermal shield 520 protecting them from damage. This increases the design flexibility within battery packs 10. It is noted that supporting member 500 may have any cross-sectional shape sufficient for supporting connector 510 and/or thermal shield 520. For example, recesses 530, 540 may optionally not be present, with supporting member 500 having generally flat or planar upper and lower surfaces to which the connector 510 and/or thermal shield 520 may be coupled in any suitable manner.

Figure 6:
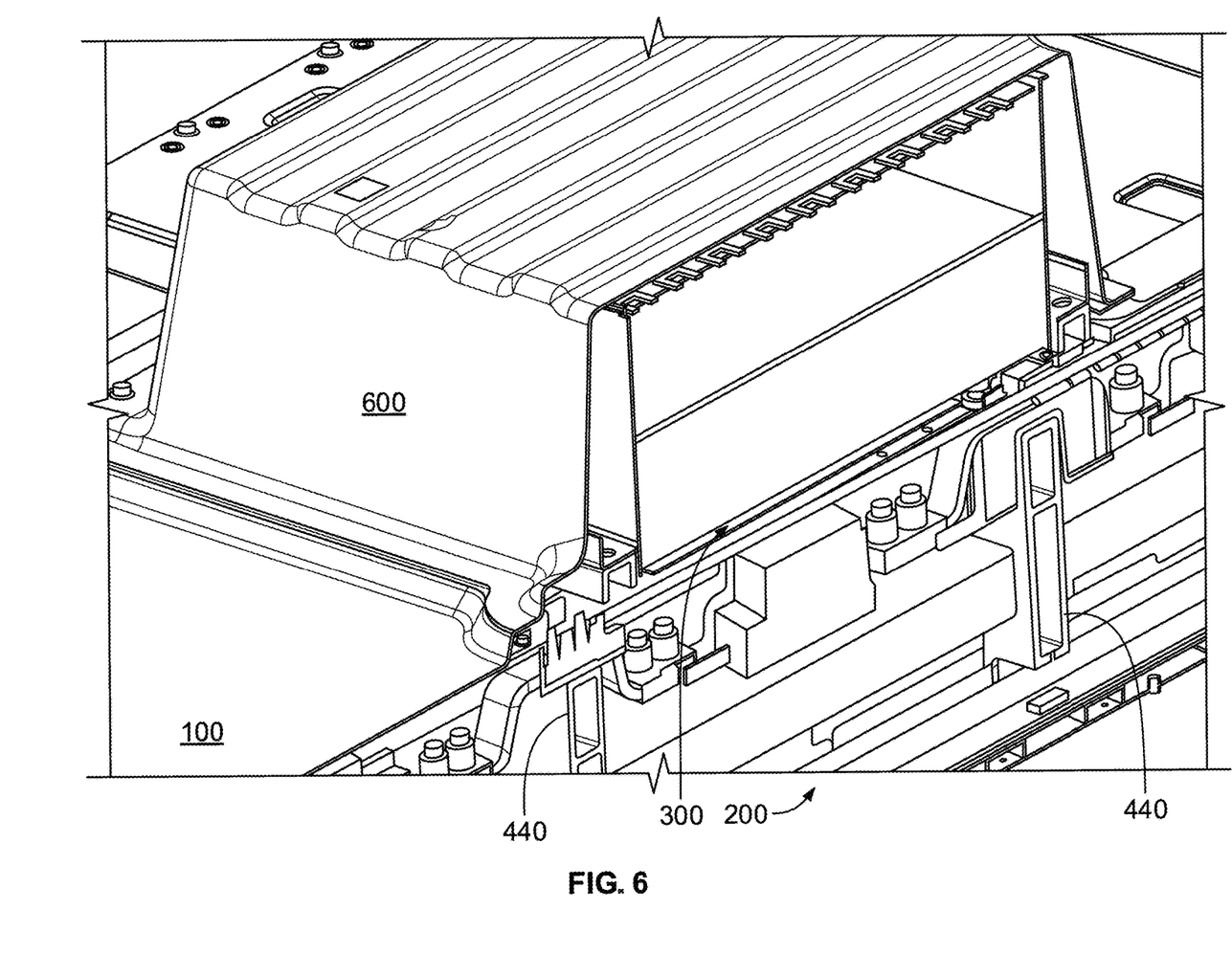
FIG. 6 is an isometric cutaway views of a thermal shield placed within a battery pack to protect two overlying battery modules, in accordance with embodiments of the disclosure.

It is noted that the thermal shield 300 (or another similar thermal shield) may support, and thus protect, any components of a battery pack 10, including other batteries 200. Accordingly, in some embodiments of the disclosure one or more batteries 200 may be placed above the thermal shield 300, so that thermal shield 300 protects its overlying battery 200 from flame jets emitted by another underlying battery 200. FIG. 6 is an isometric cutaway views of a thermal shield placed within a battery pack to protect two overlying battery modules, in accordance with embodiments of the disclosure. Here, a housing 600 is affixed to the upper surface of cover 100, to cover and protect one or more battery pack 10 components placed therein. Any components may be positioned within housing 600. In some embodiments of the disclosure, the housing 600 may be sized to hold a battery module 602 which holds one or more batteries 200 within. Thermal shield 300 is affixed to one or more cross members 440 of frame 110 underneath housing 600 as shown, covering underlying battery module 604 which holds one or more batteries 200 within. In this manner, thermal shield 300 may be placed between battery modules 602 and 604 and their corresponding batteries 200, one below the thermal shield 300 in the view of FIG. 6, and one above. The thermal shield 300 thus protects the batteries 200 within battery module 602 from heat emitted by the battery 200 underneath. In some embodiments, the battery modules 602 and 604 each comprise two layers of batteries with the top layer having venting ends facing up and the bottom layer having venting ends facing down. In such embodiments, the thermal shield 300 protects battery module 602 from heat emitted by the batteries of the top layer of battery module 604 and protects the battery module 604 from heat emitted by the batteries of the bottom layer of battery module 602.

Thermal shield 300 may be affixed in any secure manner, to any portion of battery pack 10. For example, while thermal shield 300 is described above as being affixed to cross member 440, it may alternatively be affixed to a portion of frame 110, or to a sufficiently secure portion of cover 100.

Components within housing 600 may be affixed to thermal shield 300 as previously described above. Alternatively, these components may be affixed to the housing 600, to frame 110, or to a portion of cover 100, so that the components are not affixed to thermal shield 300 even though the shield 300 remains positioned so as to protect them from fire damage. Housing 600 may support any one or more components of battery pack 10.

The foregoing description, for purposes of explanation, used specific nomenclature to provide a thorough understanding of the disclosure. However, it will be apparent to one skilled in the art that the specific details are not required to practice the methods and systems of the disclosure. Thus, the foregoing descriptions of specific embodiments of the present disclosure are presented for purposes of illustration and description. They are not intended to be exhaustive or to limit the invention to the precise forms disclosed. Many modifications and variations are possible in view of the above teachings. For example, thermal shields of embodiments of the disclosure may have affixed thereto, or otherwise support, any one or more components of an electric vehicle battery pack. Such thermal shields may be constructed of any thermal-resistant material or materials. Thermal shields may further be positioned over venting ends of any batteries, and may have one or more extensions, continuous or discontinuous, protecting any battery pack components extending across any portion of a battery pack. The embodiments were chosen and described in order to best explain the principles of the disclosure and its practical applications, to thereby enable others skilled in the art to best utilize the methods and systems of the disclosure and various embodiments with various modifications as are suited to the particular use contemplated. Additionally, different features of the various embodiments, disclosed or otherwise, can be mixed and matched or otherwise combined so as to create further embodiments contemplated by the disclosure.

What is claimed is:

1. A thermal-resistant electric vehicle battery pack, the battery pack comprising:
   an upper housing defining a first volume for storing a first group of batteries therein, wherein one or more of the first group of batteries comprise a venting end oriented towards a bottom of the upper housing;
   a lower housing defining a second volume for storing a second group of batteries therein, wherein one or more of the second group of batteries comprise a venting end oriented towards a top of the lower housing; and
   a thermal shield positioned between the upper and lower housings, the thermal shield affixed to a frame of the battery pack such that the thermal shield is configured to support the upper housing thereon.

2. The battery pack of claim 1, wherein the thermal shield comprises a metallic substrate.

3. The battery pack of claim 2, wherein the metallic substrate is a steel substrate.

4. The battery pack of claim 2, wherein the thermal shield further comprises a fire-resistant coating formed on the metallic substrate to face the batteries.

5. The battery pack of claim 4, wherein the coating comprises a polymer resin.

6. The battery pack of claim 4, wherein the coating comprises one or more of a powder coating or a mineral coating.

7. The battery pack of claim 1, further comprising one or more components positioned between the upper housing and lower housing, wherein the one or more components include one or more of a busbar or a connector for coupling to the batteries.

8. The battery pack of claim 1, wherein the thermal shield has a first portion sized to accept a busbar positioned thereon, and a second portion sized and shaped to extend under a busbar extension coupled thereto and extending to a side of the electric vehicle battery pack.

9. The battery pack of claim 8, further comprising a track coupled to a frame of the electric vehicle battery pack, the second portion of the thermal shield and the busbar extension being coupled thereto.

10. The battery pack of claim 1, wherein the thermal shield is positioned at least 5 mm above the lower housing.

11. An apparatus for preventing thermal damage in an electric vehicle battery pack, the apparatus comprising:
a thermal shield configured for installation in an electric vehicle battery pack, the thermal shield having a first side facing one or more venting ends of a first group of one or more batteries of a first group stored in a first volume of a first housing, and a second side opposite from the first side, the second side facing one or more venting ends of a second group of one or more batteries of a second group stored in a second volume of a second housing, the thermal shield configured to be affixed to a frame of the battery pack such that the thermal shield is configured to support the second housing thereon.

12. The apparatus of claim 11, further comprising one or more electrical components positioned between the first housing and the second housing, wherein the one or more electrical components include one or more of a busbar or a connector for electrical connection to the one or more batteries.

13. The apparatus of claim 11, wherein the thermal shield has a first portion sized to accept a busbar positioned thereon, and a second portion sized and shaped to extend under a busbar extension coupled thereto and extending to a side of the electric vehicle battery pack.

14. The apparatus of claim 13, further comprising a track configured for coupling to a frame of the electric vehicle battery pack, the second portion of the thermal shield and the busbar extension being coupled thereto.

15. A method comprising:
positioning a thermal shield within an electric vehicle battery pack having an upper housing defining a first volume with one or more batteries of a first group therein, wherein one or more of the first group of batteries comprise a venting end oriented towards a bottom of the upper housing, the electric vehicle battery pack having a lower housing defining a second volume for storing one or more batteries of a second group therein, wherein one or more of the second group of batteries comprise a venting end oriented towards a top of the lower housing, the thermal shield positioned between the upper and lower housings, the thermal shield being configured to be affixed to a frame of the battery pack such that the thermal shield is configured to support the upper housing thereon.

16. The method of claim 15, further comprising coupling one or more components to the thermal shield, wherein the one or more components include one or more of a busbar or a connector for coupling to the batteries.

17. The method of claim 15, wherein the coupling further comprises:
affixing a busbar to a first portion of the thermal shield; and
affixing a busbar extension and a second portion of the thermal shield to a track affixed to a frame of the electric vehicle battery pack;
wherein the track, the busbar extension, and the second portion of the thermal shield each extend to a side of the electric vehicle battery pack.

18. The method of claim 17, wherein the coupling further comprises affixing the busbar extension to a first surface of the track, and affixing the second portion of the thermal shield to an opposing second surface of the track.

19. The battery pack of claim 1, wherein the thermal shield comprises a plate structure and one or more channels, the one or more channels configured to be affixed to a cross member of the frame.

20. The battery pack of claim 19, wherein the channel defines an elevation between a connection body of the thermal shield and the plate structure, thereby raising the plate structure above the lower housing.

* * * * *